July 3, 1962

J. I. MILLER 3,042,376

AUTOMATIC CLUTCH KICKOUT

Filed July 7, 1954

John I. Miller
INVENTOR.

BY *Clarence A. O'Brien*
*and Harvey B. Jacobson*
Attorneys

July 3, 1962  J. I. MILLER  3,042,376
AUTOMATIC CLUTCH KICKOUT
Filed July 7, 1954  3 Sheets-Sheet 2

John I. Miller
INVENTOR.

BY Clarence A. O'Brien
and Harvey B. Jacobson
Attorneys

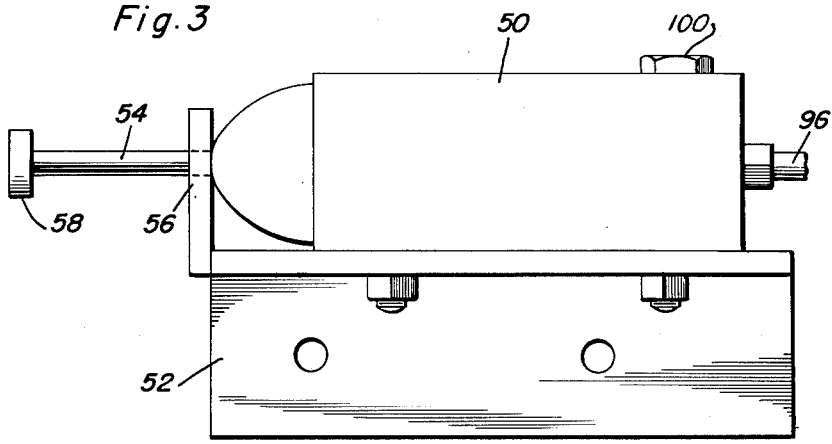
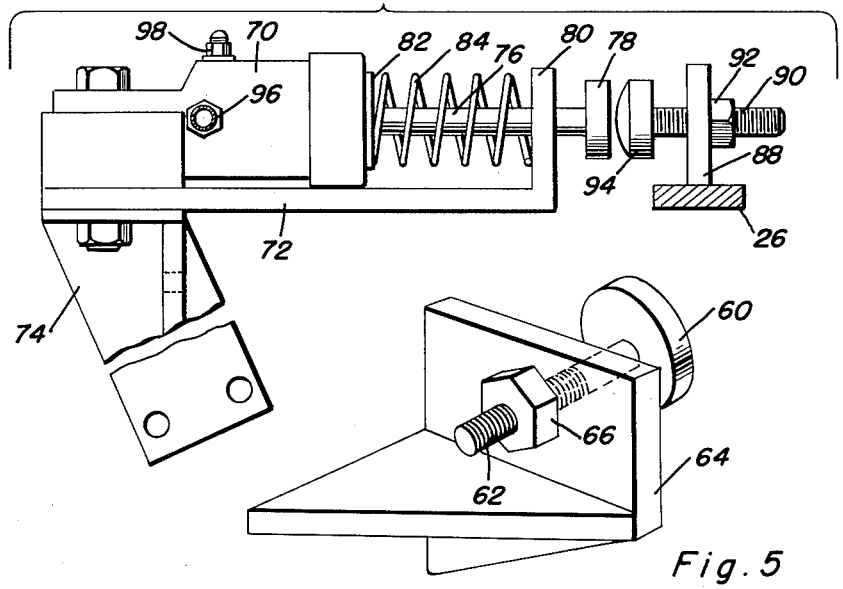
John I. Miller
INVENTOR.

United States Patent Office 3,042,376
Patented July 3, 1962

3,042,376
AUTOMATIC CLUTCH KICKOUT
John I. Miller, 1264 3rd St., Phillipsburg, Kans.
Filed July 7, 1954, Ser. No. 441,763
2 Claims. (Cl. 254—187)

This invention relates to an automatic clutch kickout and particularly to a kickout for operating a clutch independent upon a predetermined movement of a movable part.

In the operation of many devices such as dirt moving devices, it is necessary to move a plunger a predetermined distance to accomplish a particular purpose after which the forward movement of the plunger must be immediately terminated. In the operation of dirt moving equipment it is customary to provide a tractor portion having a power take-off equipment driving a drum and a dirt hauling or moving equipment constituting a trailer portion having a body or scoop adapted to contain a quantity of dirt and a plunger movable across the body for discharging the dirt therefrom and a cable connection between the drum on the tractor portion and a plunger portion for causing the forward motion of the plunger. Heretofore, considerable difficulty has been encountered because the operator of the device frequently does not disengage the clutch in sufficient time to prevent breakage of the cable connecting the drum to the plunger.

The present invention relates to an automatic clutch kickout device for de-energizing the clutch controlling the drum so that the cable operating the plunger will not be broken.

In the construction according to the invention a driving cylinder is provided adjacent to the plunger and a driven cylinder is provided adjacent to the clutch operating lever and the two cylinders are connected together by a conduit and sufficient fluid is provided in the system so that the conduit and one of the cylinders will be constantly full of fluid. Preferably resilient means are provided for urging the driven cylinder to the retracted position so that the driving cylinder will be in distended relation. In any event, the driven cylinder will be in retracted position when the lever is moved to clutch engaging relation and the driving cylinder will have the piston rod projecting therefrom and a projection or stop will be provided on the ram member for urging the piston of the driving cylinder into position to drive the fluid into the driven cylinder so that the forward motion of the ram will cause operation of the cylinders to move the lever to disengaging relation.

It is accordingly an object of the invention to provide an improved clutch disengaging device.

It is a further object of the invention to provide a clutch disengaging device operable on predetermined motion of a movable member.

It is a further object of the invention to provide means for preventing the breaking of a driving cable operated by a clutch engaged drum.

Other objects and many of the attendant advantages of the present invention will be apparent from the following detailed description taken in conjunction with the accompanying drawings in which:

FIGURE 3 is an enlarged elevational view of the driving cylinder showing the construction thereof;

FIGURE 4 is an enlarged elevational view of the driven cylinder showing the construction and mounting thereof; and FIGURE 5 is an enlarged perspective view of an adjustable stop member for operating the driving cylinder.

Figure 1:
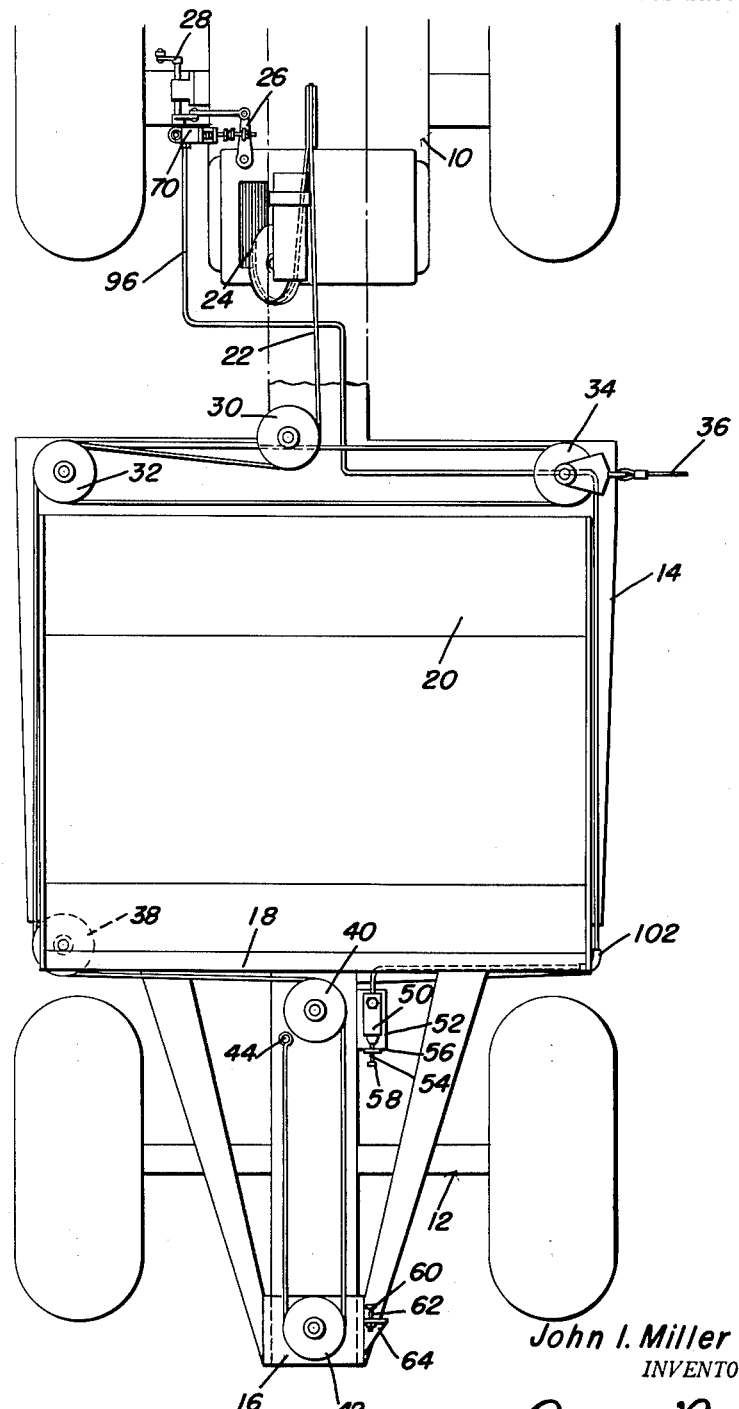
FIGURE 1 is a schematic plan view of an earth-moving machine showing the attachment of the clutch kickout device thereto with the clutch operating lever in clutch engaging position.

In the exemplary embodiment according to the construction, an earth-moving device comprises a forward or tractor section 10 and a following or trailer section 12 having a dirt-carrying body 14 therein with a ram ejector 16 reciprocably mounted in the trailer portion and having a pusher head 18 thereon. A closure apron 20 is provided adjacent the forward end of the carrying body 14 and the ejector 16 and the apron 20 is controlled by means of a cable 22 which is wound on a drum 24 controlled by a clutch, not shown, and operated by a clutch-operating lever 26. The lever 26 being connected by suitable linkages 28 to an operator station, not shown. The earth-moving equipment heretofore described is a standard and well known piece of equipment and forms no part of the present invention other than the setting therefor.

Also in standard arrangement the cable 22 is passed over a sheave 30, a sheave 32 and a sheave 34 which is mounted in a block and movable on a track to operate a cable 36 which controls the operation of the apron 20. The cable 22 then extends over a sheave 38 and a plurality of multiplying sheaves 40 and 42 to be anchored at the point 44 on the trailing portion 12. The sheave 42 being mounted on the plunger 16 which will move forward when the drum takes in the cable 22.

The clutch kickout proper comprises a driving cylinder 50 mounted on a bracket 52 on the trailer portion 12 in proximity to the ram member 16. A piston (not shown) is mounted in the cylinder 50 and a piston rod 54 extends longitudinally therefrom through a suitable guide member 56. Preferably the piston rod 54 terminates in a contact head 58 for engagement with a contact head 60 carried on an adjustable bolt 62 mounted in a bracket 64 on the plunger 16. Preferably the adjusting bolt 62 is threaded and is in threaded engagement with the bracket 64 and locked in position by means of a lock nut 66.

A driven cylinder 70 is mounted on a bracket 72 which in turn is supported by means of an angle bracket 74 mounted on the tractor portion 10. A piston rod 76 extends outwardly from a piston, not shown, in the cylinder 70 and terminates in a pusher head 78. The piston rod 76 extends through a bearing member 80 and has a stop member 82 rigidly mounted thereon so that a spring 84 may be mounted between the bearing member 80 and the stop member 82 so that the spring member 84 constantly urges the piston rod 76 into retracted position so that the piston, not shown, will be at the rear of the cylinder during normal position of the device. An ear 88 will be mounted on the clutch actuating lever 26 and a threaded adjusting rod 90 will be threadedly mounted therein and locked in position by means of a lock nut 92 and the rod 90 will have a thrust head 94 thereon for engagement with the head 78 of the piston rod 76.

A fluid conduit 96 will communicate the cylinders 70 and 50 so that the fluid may be transferred between the cylinders 50 and 70 as may be desired.

Figure 2:
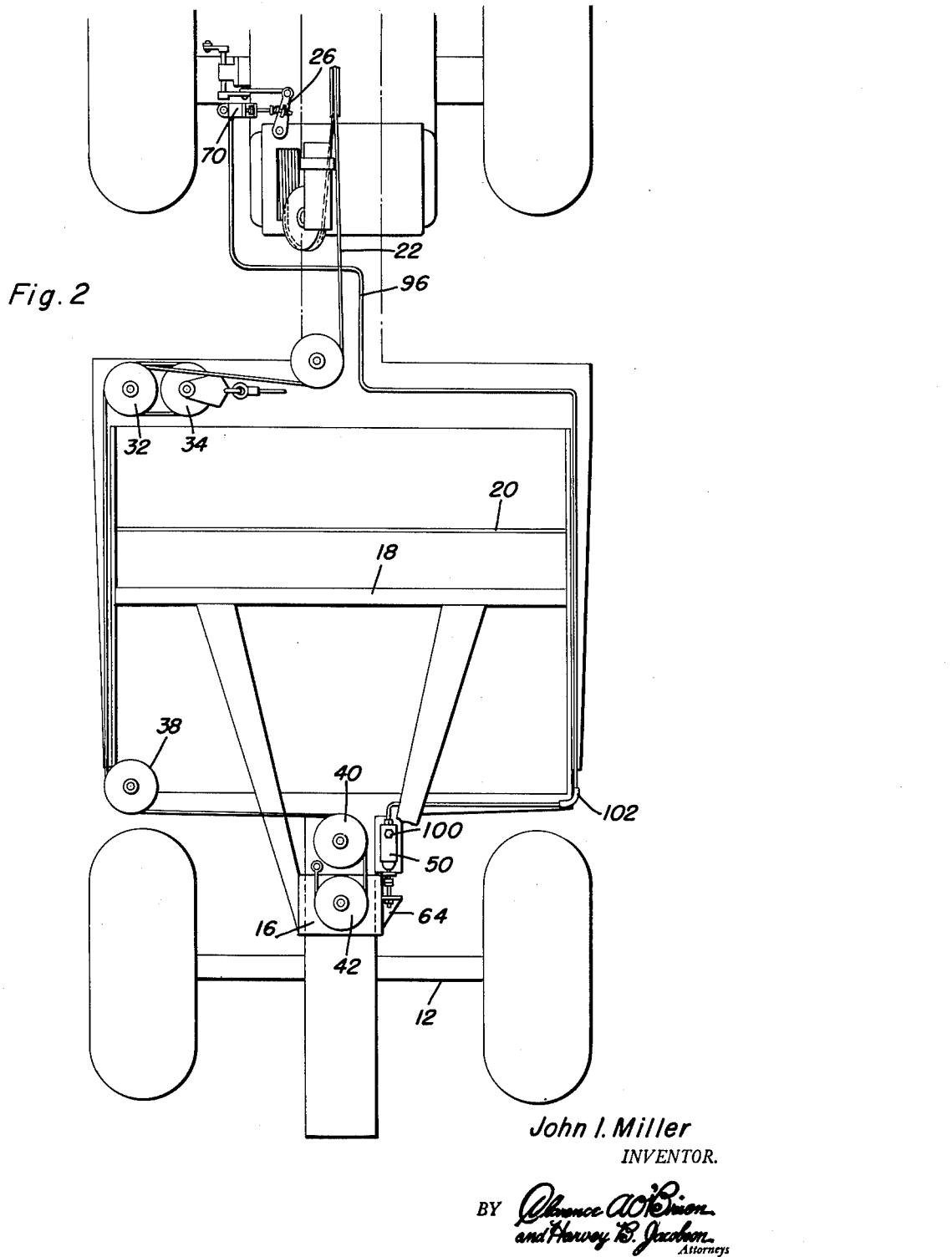
FIGURE 2 is a similar plan view showing the device in actuated position with the kickout device moving the clutch engaging lever to disengaging position.

In the operation of the dirt-handling machine as has heretofore been known, the device will be normally in retracted position as shown in FIGURE 1 at which time the body 14 may be filled with dirt or other material and the apron or lip 20 raised to retain the material therein. When it is desired to dump the dirt the operator of the device will move the lever 26 to the position shown in FIGURE 1 to engage the clutch so that the drum 24 will retrieve the cable 22 so that the sheave 34 will be drawn across the track provided in the member 12 to haul in the cable 22 and open the apron 20 after which the cable 22 will continue to move onto the drum 24 causing the sheave 42 to move forward pushing the ejector 16 forward together with the member 18 to push the dirt therefrom until the stop member 60 engages the head 58 of the piston rod 54 pushing the fluid out of the cylinder 50 through the conduit 96 into the cylinder 70 which in turn pushes the rod 76 forward to move the operating lever 26 to clutch disengaging position as shown in FIGURE 2.

It will be understood that the cylinders 50 and 70 will have a quantity of liquid, such as hydraulic fluid therein and that the quantity of fluid will be sufficient to fill one of the cylinders and the conduit 96. Preferably the cylinder 70 will be provided with a bleeder valve 98 and the cylinder 50 will be provided with a filling plug 100. In this manner any leakage of oil from the system may be readily replaced if desired or any particularly desired quantity of fluid may be introduced therein to control the point of operation of the stop device. Preferably the cylinder 50 has a self-contained or built in reservoir containing replacement fluid.

The conduit 96 may be mounted in any suitable manner on the parts 10 and 12 and preferably it will be mounted around the edge of the scoop body 14 and if desired may be protected at the various corners by means of suitable rubberized pads 102.

For purpose of exemplification a particular application and construction of the invention has been shown and described according to the best present understanding thereof. However, it will be apparent to those skilled in the art that various constructions and modifications according to the invention may be readily resorted to and that the device may be applied to various applications without departing from the true spirit and scope of the invention.

What is claimed as new is as follows:

1. An earth-moving device having a reciprocating ram, a winding drum, a cable secured to said ram and on said drum, a clutch device operable to control rotation of said drum and movement of said ram, a clutch operating lever, a hydraulic fluid cylinder mounted in proximity to said lever, a piston in said cylinder, a piston rod extending from said cylinder into the path of movement of said lever, said piston being moved to retracted position when said lever is in clutch engaging position, a driving hydraulic fluid cylinder mounted adjacent to said ram, a piston in said driving cylinder, a piston rod extending from said driving cylinder, a conduit communicating said cylinders, a quantity of liquid in said cylinders and said conduit sufficient to fill said conduit and one of said cylinders, means engageable with said driving cylinder and operable on predetermined movement of said ram to transfer the liquid from said driving cylinder into said driven cylinder for restraining movement of said ram.

2. In an earth moving assembly which includes a drawn vehicle having a dumpable body, a cable operated ejector for said body, a draft vehicle supported winding drum around which cable is wound, and a clutch lever to control said drum, the improvement comprising: an attachment which has a driving cylinder mounted adjacent to said ejector and including a piston rod, a bracket attached to said ejector and movable therewith, said bracket being in alignment with said piston rod in order to actuate said piston rod in response to cable operated movement of said ejector, a driven cylinder having a driven cylinder piston rod, means including a mounting bracket supporting said driven cylinder and piston rod adjacent to said clutch operating lever, a fluid conducting line intercommunicating said cylinders so that when said driving cylinder is actuated to piston and piston rod in said driven cylinder are correspondingly actuated, an ear mounted on said lever, and means adjustably carried by said ear and arranged to be contacted by said driven cylinder piston rod for imparting movement of said piston rod to said clutch lever in a direction to disengage said clutch in response to a predetermined extent of movement of said ejector carried bracket.

References Cited in the file of this patent
UNITED STATES PATENTS

| | | |
|---|---|---|
| 1,835,902 | Rommel | Dec. 8, 1931 |
| 2,376,019 | Thomas | May 15, 1945 |
| 2,383,978 | LeTourneau | Sept. 4, 1945 |
| 2,525,220 | Hague | Oct. 10, 1950 |
| 2,565,850 | Hyler et al. | Aug. 28, 1951 |
| 2,620,161 | Royer | Dec. 2, 1952 |
| 2,628,815 | Atkinson et al. | Feb. 17, 1953 |